United States Patent Office 3,635,884
Patented Jan. 18, 1972

3,635,884
ORGANIC COMPOSITIONS STABILIZED WITH PHOSPHORUS-CONTAINING ADDITIVES
Bernard R. Meltsner, Royal Oak, Mich., assignor to Ethyl Corporation, New York, N.Y.
No Drawing. Application Nov. 21, 1966, Ser. No. 595,613, now Patent No. 3,493,638, dated Feb. 3, 1970, which is a continuation-in-part of application Ser. No. 505,990, Nov. 1, 1965. Divided and this application Nov. 5, 1969, Ser. No. 874,416
Int. Cl. C08c 27/64; C08d 11/04; C08f 45/58
U.S. Cl. 260—45.85      8 Claims

ABSTRACT OF THE DISCLOSURE

A new class of antioxidants is prepared by the reaction of phosphorus trihalides with 2,6-dihydrocarbyl-p-hydroquinones. A typical example is the product prepared by the reaction of phosphorus trichloride with 2,6-di-tert-butyl-p-hydroquinone. A major component of the reaction product has been identified as tris(3,5-di-tert-butyl-4-hydroxyphenyl)phosphite. Another component present in lesser amounts is bis(3,5-di-tert-butyl-4-hydroxyphenyl) hydrogen phosphonate. Both the reaction product and the pure tris(3,5-di-tert-buty-4-hydroxyphenyl)phosphite have been found to be antioxidants in organic materials, especially in polypropylene and lubricating oil. They also exhibit a synergistic antioxidant response with dialkyl thiodialkanoates such as dilaurylthiodipropionate.

---

This application is a division of application Ser. No. 595,613, filed Nov. 21, 1966, now U.S. Pat. 3,493,638, issued Feb. 3, 1970 which in turn is a continuation-in-part of application Ser. No. 505,990, filed Nov. 1, 1965, now abandoned.

Most organic materials undergo degradation in the presence of oxygen. This degradation is accelerated at increased temperatures. Frequently, high temperatures are encountered during the processing of these materials in manufacturing operations and thus some form of stabilizer is required for many materials, even during the manufacturing stage. Other materials are not subject to extremes in temperature during manufacture, but even these undergo degradation on aging.

An object of this invention is to provide an additive capable of preventing degradation of organic materials due to oxygen. A further object of this invention is to provide organic materials that are stable against the effects of oxygen at elevated temperatures during manufacture and also stable during long periods of aging under use conditions. A particular object is to provide a polyolefin (e.g., polypropylene) of exceptional high-temperature stability and capable of resisting degradation due to oxygen during long periods of use. Other objects will become apparent from the following description of the invention.

The above and other objects are accomplished by providing a product produced by the process comprising reacting a phosphorous trihalide selected from the group consisting of phosphorous trichloride and phosphorous tribromide with a hydroquinone, said hydroquinone having the formula:

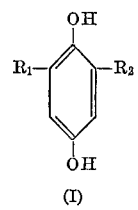

(I)

wherein $R_1$ is selected from the group consisting of alpha-branched alkyl radicals containing from 3–18 carbon atoms, alpha-branched aralkyl radicals containing from 8–18 carbon atoms and cycloalkyl radicals containing from 6–18 carbon atoms; and $R_2$ is selected from the group consisting of alkyl radicals containing from 1–18 carbon atoms, aralkyl radicals containing from 7–18 carbon atoms, aryl radicals containing from 6–18 carbon atoms and cycloalkyl radicals containing from 6–18 carbon atoms, in the mole ratio of from about 2–4 moles of said hydroquinone per mole of said phosphorous trihalide at a temperature of from 0 to 200° C.

The products of this invention are readily prepared by reacting a 2,6-dihydrocarbyl-p-hydroquinone having Formula I with a phosphorous trihalide. Although any of the phosphorous trihalides may be employed, the preferred reactants are phosphorous tribromide and phosphorous trichloride and especially phosphorous trichloride because of its low cost, availability and excellent results obtained with its use.

Some examples of useful p-hydroquinones having Formula I are:

2-methyl-6-tert-butyl-p-hydroquinone
2-ethyl-6-isopropyl-p-hydroquinone
2-methyl-6-cyclohexyl-p-hydroquinone
2-n-propyl-6-(α-methylbenzyl)-p-hydroquinone
2-methyl-6-(α-methylbenzyl)-p-hydroquinone
3-methyl-6-(α,α-dimethylbenzyl)-p-hydroquinone
2-phenyl-6-tert-butyl-p-hydroquinone In a preferred embodiment, both $R_1$ and $R_2$ in Formula I are alpha-branched hydrocarbyl radicals. Some representative examples of these hydroquinones are:

2,6-diisopropyl-p-hydroquinone
2,6-dicyclohexyl-p-hydroquinone
2,6-di-sec-butyl-p-hydroquinone
2-isopropyl-6-tert-butyl-p-hydroquinone
2-tert-butyl-6-(α-methylbenzyl)-p-hydroquinone
2-tert-butyl-6-cyclohexyl-p-hydroquinone
2-tert-dodecyl-6-sec-octadecyl-p-hydroquinone
2-tert-nonyl-6-sec-octyl-p-hydroquinone In a further preferred embodiment, both $R_1$ and $R_2$ in Formula I are tertiary alkyl radicals. These may be illustrated by the following hydroquinones.

2,6-di-tert-amyl-p-hydroquinone
2,6-di-tert-octyl-p-hydroquinone
2,6-di-tert-dodecyl-p-hydroquinone
2,6-di-tert-octadecyl-p-hydroquinone
2,6-di(α,α-dimethylbenzyl)-p-hydroquinone
2-tert-butyl-6-tert-octyl-p-hydroquinone
2-tert-butyl-6-(α,α-dimethylbenzyl)-p-hydroquinone
2-tert-amyl-6-tert-octadecyl-p-hydroquinone The most preferred hydroquinone of Formula I is 2,6-di-tert-butyl-p-hydroquinone.

The 2,6-dihydrocarbyl-p-hydroquinones can be prepared by any of the methods available in the art such as the oxidation of the corresponding 2,6-dihydrocarbyl-p-aminophenol to the 2,6-dihydrocarbyl-benzoquinone followed by reduction to the 2,6-dihydrocarbyl-p-hydroquinone. An especially useful method for preparing the preferred hydroquinones is through the air oxidation of the proper 2,6-di-tert-alkyl-4-tert-butylphenol. The air oxidation of such compounds leads to 2,6-di-tert-alkyl-p-benzoquinones which are readily converted to the corresponding hydroquinone by reduction. This method is described in detail by H. G. Braxton et al. in U.S. 3,213,114.

The stoichiometry of the reaction requires three moles of the 2,6-dihydrocarbyl-p-hydroquinone per mole of phosphorous trihalide. More or less of the hydroquinone can be employed. A useful range is from 2-4 moles of the hyldroquinone per mole of phosphorous trihalide. A more preferred range is from about 2.8 to 3.1 moles per mole of phosphorous trihalide. A most preferred range is from about 2.9 to 3 moles of 2,6-dihydrocarbyl-p-hydroquinone per mole of phosphorous trihalide.

The reaction between the hydroquinones and the phosphorous trichloride can be conducted by adding the phosphorous trichloride to the hydroquinone or by adding the hydroquinone to the phosphorous trichloride. The preferred method is to add the phosphorous trichloride to the hydroquinone.

The reaction may be conducted in the presence or absence of a solvent. Usually it is preferred to employ a solvent because this makes it easier to moderate the reaction and also to purify the product. Preferred solvents are those in which the reactants are soluble and which are inert to the reactants or products under the reaction conditions. Some examples of these are ethers such as diethyl ether, ethyl butyl ether, di-n-propyl ether, ethylene glycol diethyl ether, diethyleneglycol dimethyl ether, and the like; esters such as ethyl acetate, amyl acetate, ethyl butyrate, and the like; and hydrocarbons such as hexane, heptane, isooctane, kerosene, petroleum ether (mixtures of low boiling hydrocarbons), mineral spirits, and the like. The more preferred solvents are hydrocarbons having a boiling point of from about 50° to about 200° C. Some examples of highly preferred solvents are toluene and xylene.

The reaction should be conducted at a temperature high enough so that the reaction proceeds at a reasonable rate, but not so high as to cause degradation of the product. A preferred temperature range is from about 0° C. up to about 200° C. A more preferred range is from 20 to 150° C., and a most preferred temperature range is from about 50 to 100° C.

The reaction involves the evolution of a hydrogen halide, for example, HCl, and thus can be conducted in the presence of a hydrogen halide acceptor. Especially suitable hydrogen halide acceptors are the tertiary amines such as pyridine or triethylamine. When a hydrogen halide acceptor is employed the preferred quantity used is an amount sufficient to react with the hydrogen halide evolved during the process.

The reaction may be conducted in the presence of air, although it is usually preferred to carry the reaction out under a relatively inert atmosphere. An inert atmosphere removes the danger of explosions and lessens the likelihood of contaminating the product through oxidation. Although the process can be conducted at temperatures both below and above atmospheric pressure, it is normally conducted at atmospheric pressure.

The addition of the phosphorous trihalide to the 2,6-dihydrocarbyl-p-hydroquinone usually takes from about 15 minutes to several hours, depending upon the size of the reaction and the efficiency of heat removal. The addition time is not critical and can be carried out at as high a rate as permitted by the cooling means available. Under normal conditions the addition is readily completed in from about 30 minutes to an hour. Preferably, the reaction is stirred at the reaction temperature for a short period following the completion of the addition of the reactants. Under most circumstances the reaction is complete in from about 0.5 to 8 hours following completion of addition. A preferred reaction time is from about one to 4 hours, and a most preferred reaction time is from about 2 to 3 hours.

The product may be recovered by any of the means known to those skilled in the art. One useful method when a tertiary amine hydrogen halide acceptor is employed is to first filter off the tertiary amine hydrogen halide complex, following which all solvent is distilled from the filtrate, leaving a semi-liquid residue. This residue may be used as is or may be converted to a crystalline form by dissolving in a hot aliphatic hydrocarbon such as hexane and, upon cooling, the product will crystallize in good yield.

In another method of recovering the product the reaction mass is merely washed with water at the end of the reaction period to remove any residual hydrogen halide. It is then preferably washed with a slightly basic solution (e.g., dilute $Na_2CO_3$ solution) to neutralize any remaining acid. The solvent is then removed as previously.

The product can be recovered by merely evaporating any solvent employed and using the residue as is. In still another embodiment the solution of the stabilizer may be used directly in blending with the organic materials requiring stabilization. Thus, when the reaction is conducted in a toluene solvent, the toluene solution of the stabilizer may be washed and neutralized to remove acidic material and then sprayed directly onto, for example, bulk polypropylene. The solvent is then evaporated off and the bulk polypropylene is ready for processing (e.g., molding, extrusion, and the like). Another method is to add the solution of the stabilizer to a solution of the material to be stabilized and then to remove the solvent. This method is most useful when adding the stabilizer to polymers prepared in solvents such as poly-cis-butadiene.

The reaction of phosphorous trihalides with hydroquinones of Formula I has been found to give a mixture of products. Several of these resulting from the reaction of phosphorous trichloride and 2,6-di-tert-butyl-hydroquinone have been separated and identified. These are the major product, tris(3,5 - di-tert-butyl-4-hydroxyphenyl) phosphite, and lesser amounts of bis(3,5-di-tert-butyl-4-hydroxyphenyl)hydrogen phosphonate. These new compounds can be represented by the formula:

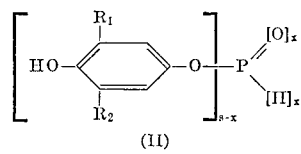

(II)

wherein $x$ is an integer from 0-1, $R_1$ is selected from the group consisting of alpha-branched alkyl radicals containing from 3-18 carbon atoms, alpha-branched aralkyl radicals containing from 8-18 carbon atoms and cycloalkyl radicals containing from 6-18 carbon atoms; and $R_2$ is selected from the group consisting of alkyl radicals containing from 1-18 carbon atoms, aralkyl radicals containing from 7-18 carbon atoms, aryl radicals containing from 6-18 carbon atoms and cycloalkyl radicals containing from 6-18 carbon atoms.

These new compounds may be used as antioxidants in the form of the reaction product which they comprise or they may be separated and used individually or as mixtures. They are effective antioxidants either individually, in mixtures, or in the reaction product. Of course, the reaction product is an excellent antioxidant in its own right and, although two of the types of components found in it have been identified, it is not possible to adequately define the reaction product by its components and hence separate embodiments of the invention are represented by the individual compounds of Formula II and the product produced by the reaction of phosphorous trihalides with the hydroquinones of Formula I. A feature of the reaction products described herein is that, although they contain lesser amounts of the very effective tris(3,5-dihydrocarbyl-4-hydroxyphenyl) phosphites than does the purified material, they exhibit a similar degree of antioxidant effectiveness, and thus represent an economic advantage.

The following compounds serve to illustrate new tris-(3,5 - dihydrocarbyl - 4 - hydroxyphenyl) phosphites represented by Formula II when $x$ is zero.

tris(3-methyl-5-tert-butyl-4-hydroxyphenyl)phosphite
tris(3-ethyl-5-ispropyl-4-hydroxyphenyl)phosphite
tris(3-methyl-5-cyclohexyl-4-hydroxyphenyl)phosphite
tris(3-n-propyl-5-(α-methylbenzyl)-4-hydroxyphenyl)-
  phosphite
tris(3-methyl-5-(α-methylbenzyl)-4-hydroxyphenyl)-
  phosphite
tris(3-methyl-5-(α,α-dimethylbenzyl)-4-hydroxy-
  phenyl)phosphite
tris(3-phenyl-5-tert-butyl-4-hydroxyphenyl)phosphite In a preferred embodiment both $R_1$ and $R_2$ are alpha-branched hydrocarbyl radicals. Some representative examples of these compounds are:

tris(3,5-diisopropyl-4-hydroxyphenyl)phosphite
tris(3,5-dicyclohexyl-4-hydroxyphenyl)phosphite
tris(3,5-di-sec-butyl-4-hydroxyphenyl)phosphite
tris(3-isopropyl-5-tert-butyl-4-hydroxyphenyl)phosphite
tris(3-tert-butyl-5-(α-methylbenzyl)-4-hydroxy-
  benzyl)phosphite
tris(3-tert-butyl-5-cyclohexyl-4-hydroxyphenyl)phosphite
tris(3-tert-dodecyl-5-sec-octadecyl-4-hydroxy-
  phenyl)phosphite
tris(3-tert-nonyl-5-sec-octyl-4-hydroxyphenyl)phosphite In a more preferred embodiment both $R_1$ and $R_2$ are tertiary alkyl radicals. These may be illustrated by the following compounds.

tris(3,5-di-tert-amyl-4-hydroxyphenyl)phosphite
tris(3,5-di-tert-octyl-4-hydroxyphenyl)phosphite
tris(3,5-di-tert-dodecyl-4-hydroxyphenyl)phosphite
tris(3,5-di-tert-octadecyl-4-hydroxyphenyl)phosphite
tris(3,5-di-(α,α-dimethylbenzyl)-4-hydroxy-
  phenyl)phosphite
tris(3-tert-butyl-5-tert-octyl-4-hydroxy-
  phenyl)phosphite
tris(3-tert-butyl-5-(α,α-dimethylbenzyl)-4-hydroxy-
  phenyl)phosphite
tris(3-tert-amyl-5-tert-octadecyl-4-hydroxyphenyl)-
  phosphite In a most preferred embodiment the tris(3,5-dihydrocarbyl-4-hydroxyphenyl)phosphite is tris(3,5-di-tert-butyl-4-hydroxyphenyl)phosphite.

The following examples serve to illustrate the new bis-(3,5-dihydrocarbyl-4-hydroxyphenyl)hydrogen phosphonates represented by Formula II when $x$ is 1.

bis(3-methyl-5-tert-butyl-4-hydroxyphenyl)hydrogen
  phosphonate
bis(3-ethyl-5-isopropyl-4-hydroxyphenyl)hydrogen
  phosphonate
bis(3-methyl-5-cyclohexyl-4-hydroxyphenyl)hydrogen
  phosphonate
bis(3-n-propyl-5-(α-methylbenzyl)-4-hydroxyphenyl)hy-
  drogen phosphonate
bis(3-methyl-5-(α-methylbenzyl)-4-hydroxyphenyl)hy-
  drogen phosphonate
bis(3-methyl-5-(α,α-dimethylbenzyl)-4-hydroxy-
  phenyl)hydrogen phosphonate
bis(3-phenyl-5-tert-butyl-4-hydroxyphenyl)hydrogen
  phosphonate In a preferred embodiment both $R_1$ and $R_2$ are alpha-branched hydrocarbyl radicals. Some representative examples of these compounds are:

bis(3,5-diisopropyl-4-hydroxyphenyl)hydrogen
  phosphonate
bis(3,5-dicyclohexyl-4-hydroxyphenyl)hydrogen
  phosphonate
bis(3,5-di-sec-butyl-4-hydroxyphenyl)hydrogen
  phosphonate
bis(3-isopropyl-5-tert-butyl-4-hydroxyphenyl)hydrogen
  phosphonate
bis(3-tert-butyl-5-(α-methylbenzyl)-4-hydroxyphenyl)hy-
  drogen phosphonate
bis(3-tert-butyl-5-cyclohexyl-4-hydroxyphenyl)hydrogen
  phosphonate
bis(3-tert-dodecyl-5-sec-octadecyl-4-hydroxyphenyl)hy-
  drogen phosphonate
bis(3-tert-nonyl-5-sec-octyl-4-hydroxyphenyl)hydrogen
  phosphonate In a more preferred embodiment both $R_1$ and $R_2$ are tertiary alkyl radicals. These may be illustrated by the following compounds.

bis(3,5-di-tert-amyl-4-hydroxyphenyl)hydrogen
  phosphonate
bis(3,5-di-tert-octyl-4-hydroxyphenyl)hydrogen
  phosphonate
bis(3,5-di-tert-dodecyl-4-hydroxyphenyl)hydrogen
  phosphonate
bis(3,5-di-tert-octadecyl-4-hydroxyphenyl)hydrogen
  phosphonate
bis(3,5-di-(α,α-dimethylbenzyl)-4-hydroxyphenyl)hydro-
  gen phosphonate
bis(3-tert-butyl-5-tert-octyl-4-hydroxyphenyl)hydrogen
  phosphonate
bis(3-tert-butyl-5-(α,α-dimethylbenzyl)-4-hydroxy-
  phenyl)hydrogen phosphonate
bis(3-tert-amyl-5-tert-octadecyl-4-hydroxyphenyl)hy-
  drogen phosphonate In a most preferred embodiment the bis(3,5-dihydrocarbyl-4-hydroxyphenyl)hydrogen phosphonate is bis(3,5-di-tert-butyl-4-hydroxyphenyl) hydrogen phosphonate.

In the above recitation and in Formula II the compounds when $x$ is 1 are named as hydrogen phosphonates. This represents the tautomeric form of the mono-acid phosphite. The accepted theory is that both forms exist in an equilibrium as shown by the following equation.

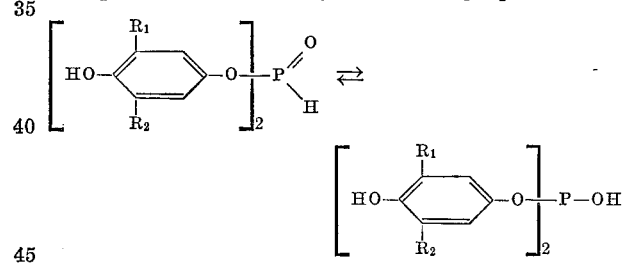

Hence, in the present invention these two materials are equivalent.

In the foregoing description, many of the preferred $R_1$ and $R_2$ radicals are referred to as "alpha-branched radicals." These are radicals wherein the carbon atom through which the radical bonds to the benzene ring is also bonded with at least two carbon atoms other than the carbon atom in the benzene ring. In other words, alpha-branched radicals are those commonly referred to as secondary or tertiary radicals such as the isopropyl and tert-butyl radicals.

The following examples will serve to illustrate the preparation of the additives of the present invention. All parts are parts by weight unless otherwise specified.

EXAMPLE 1

To a reaction vessel equipped with a stirrer, thermometer, reflux condenser and liquid addition means was charged 25 parts of 2,6-di-tert-butyl-p-hydroquinone, 88 parts of benzene and 11.4 parts of triethylamine. Nitrogen was swept through the reaction vessel to remove all oxygen and a nitrogen atmosphere was maintained over the reactants for the remainder of the reaction period. A separate solution of 5.15 parts of phosphoous trichloride and 22 parts of benzene was added to the reaction vessel, while stirring, over a period of 40 minutes. The reaction, which occurred spontaneously, was exothermic and the reaction temperature was maintained at 20 to 30° C. during the addition period by external cooling. Hydrogen chloride formed during the reaction reacted immediately with the triethylamine and formed a precipitate. The reaction mixture was allowed to stir at room temperature for eight hours and then the reaction mass was filtered to remove the triethylamine hydrochloride precipitate. The filtrate was washed with water and then dried over anhydrous sodium sulfate. The sodium sulfate was then removed by filtration, following which the benzene solvent was removed from the filtrate by slowly heating the filtrate to 50 to 60° C., while slowly reducing the pressure to about 10 mm. The viscous semi-solid residue was dissolved in 100 parts of hot hexane. The hexane solution was then cooled causing the product to precipitate as white crystals having a melting point of 148–150° C. The infrared spectra for this material was consistent with the structure for tris(3,5-di-tert-butyl-4-hydroxyphenyl) phosphite. The product was subjected to carbon, hydrogen and phosphorus elemental analysis. The results of this analysis were: carbon—72.3 percent; hydrogen—9.19 percent, and phosphorus—4.7 percent. The calculated carbon, hydrogen and phosphorus content for 3,5-di-tert-butyl-4-hydroxyphenyl phosphite is: carbon—72.6 percent; hydrogen—9.14 percent, and phosphorus—4.5 percent. Thus, the recrystallized material prepared in Example 1 was identified as tris(3,5-di-tert-butyl-4-hydroxyphenyl)phosphite.

EXAMPLE 2

To a reaction vessel equipped as in Example 1 is added 667 parts of 2,6-di-tert-butyl-p-hydroquinone and 1500 parts of toluene. Nitrogen is passed through the vessel until all air has been removed and a nitrogen atmosphere is maintained throughout the remainder of the reaction. While stirring, the vessel contents are heated to the reflux temperature of the solvent. While maintaining the reaction at reflux, 137.5 parts of phosphorous trichloride are fed over a one hour period. Cooling is effected by reflux of the solvent. Following the phosphorous trichloride addition, the reaction is refluxed for one additional hour. It is then allowed to cool and immediately upon dropping below 90° C., 1000 parts of water are added to the reaction vessel and the mixture stirred for 15 minutes. The water is drained off and the reactants are then washed with 1000 parts of a 5 percent sodium carbonate solution. This solution is drained off and the toluene solvent is then removed by reducing the pressure in the reaction vessel to 50 mm. and slowly distilling out the toluene until the reaction vessel contents reach 150° C. The remaining material is dissolved in a minimum amount of hot hexane and the hexane solution is then cooled to 0° C., causing the product to precipitate, forming a slurry. The reaction mass is then filtered and the product, tris(3,5-di-tert-butyl-4-hydroxyphenyl)phosphite, is obtained.

EXAMPLE 3

To a reaction vessel equipped as in Example 1 is added 954 parts of 2,6-di(α-methylbenzyl)-p-hydroquinone and 3000 parts of xylene. While stirring, 140 parts of phosphorous trichloride are added over a period of 4 hours while maintaining the reaction temperature at 30° C. through external cooling. Following the phosphorous trichloride addition, the reaction contents are stirred for 7 additional hours at 30° C., and then the temperature is slowly raised to 100° C. during an additional one hour period. The reaction mass is then cooled and washed twice with 1000 parts of water each. The reaction mass is then treated with 1000 parts of a 5 percent sodium carbonate solution. Following this, the xylene solvent is removed by distilling out the solvent at 30 mm. of pressure until the reaction vessel attains a temperature of 150° C. The residue is recrystallized twice from the minimum quantity of petroleum ether (B.P. 60–70° C.), yielding tris(3,5 - di-(α-methylbenzyl)-4-hydroxyphenyl) phosphite.

In the above example equal mole quantities of other 2,6-dihydrocarbyl-p-hydroquinones can be employed to give the corresponding tris(3,5-dihydrocarbyl-4-hydroxyphenyl)phosphite. For example, the use of 2,6-diisopropyl-p-hydroquinone yields tris(3,5-diisopropyl-4-hydroxyphenyl)phosphite. The use of 2,6-di-sec-butyl-p-hydroquinone yields tris(3,5-di-sec-butyl - 4 - hydroxyphenyl) phosphite. The use of 2,6-di-tert-octyl-p-hydroquinone yields tris(3,5 - di-tert-octyl-4-hydroxyphenyl)phosphite. The use of 2,6-dicyclohexyl-p-hydroquinone yields tris-(3,5-dicyclohexyl-4-hydroxyphenyl)phosphite. The use of 2,6 - di-tert-octadecyl-p-hydroquinone yields tris(3,5-di-tert-octadecyl-4-hydroxyphenyl)phosphite. The use of 2 - methyl-6-(α,α-dimethylbenzyl)-p-hydroquinone yields tris[3 - methyl-5-(α,α-dimethylbenzyl)-4-hydroxyphenyl] phosphite. The use of 2-(2,4-di-tert-butylphenyl)-6-tert-dodecyl-p-hydroquinone yields tris[3 - (2,4-di-tert-butylphenyl)-5-tert-dodecyl-4-hydroxyphenyl]phosphite.

In like manner, equal mole quantities of other phosphorus halides can be used, such as phosphorous tribromide, with good results.

EXAMPLE 4

In a reaction vessel equipped as in Example 1 was placed 39.25 parts of 2,6-di-tert-butyl-p-hydroquinone, 155 parts of toluene, and 18.9 parts of triethylamine. The mixture was stirred and cooled to 12° C. Over a period of about 1.5 hours, 8.62 parts of phosphorous trichloride was added while keeping the temperature below about 22° C. The mixture was then stirred for 21.5 hours at about 20–25° C. Following this, the mixture was washed three times with water and then with a dilute (0.23 weight percent) sodium bicarbonate solution. It was finally washed again with water. The reaction vessel was then sealed and the pressure reduced to 81 mm. Hg. The toluene and residual water were distilled out under vacuum until the liquid temperature reached 104° C. at 35 mm. Hg. The residue was cooled to 69° C. and 91.5 parts of isooctane was added. The mixture was stirred and heated to reflux. The solution was then cooled to 5° C. and the reaction product which precipitated was removed by filtration. Its melting point was 118–128° C. A small sample was subjected to thin layer chromatographic separation using a silica gel impregnated paper and a benzene eluting solvent. The chromatographic strip was developed using iodine vapor and showed two substantial components. Infrared analysis showed the main component to be tris(3,5-di-tert-butyl-4-hydroxyphenyl)phosphite.

A second component was separated from the reaction mixture as follows. A sample of the reaction product was dissolved in hot isopropanol and the solution was cooled, causing some material to precipitate. The precipitate was filtered off and then water was added to the isopropanol filtrate until it began to haze. It was allowed to stand at room temperature and some further solids precipitated. These solids were subjected to thin layer chromatographic separation and showed to be a single compound. They were then recrystallized, first from a benzene-isooctane mixture and then from benzene. The melting point was then 146–150° C. Analysis showed the composition to contain: carbon —68.6 percent; hydrogen—8.8 percent; phosphorus—6.3 percent. Theoretical analysis for bis-(3,5-di-tert-butyl - 4 - hydroxyphenyl)hydrogen phosphonate is: carbon—68.3 percent; hydrogen—8.89 percent; phosphorus—6.7 percent. A nuclear magnetic resonance spectrum was obtained for the compound and showed it to be a hydrogen phosphonate. Thus, a second compound was isolated from the reaction product and identified as bis(3,5-di-tert-butyl - 4 - hydroxyphenyl)hydrogen phosphonate. This compound is also an effective antioxidant, especially in polypropylene. Furthermore, the crude reaction product which contained the two identified ingredients in addition to other unknown material was found to be more effective on a weight basis in stabilizing polypropylene than purified tris(3,5-di-tert-butyl-4-hydroxyphenyl)phosphite. These results will be shown in the later described tests.

Reaction products similar to that prepared in the above example can be made using the previously-described hydroquinones and phosphorous trihalides under the previously-described reaction conditions. For example, a useful reaction product is obtained by reacting 3 moles of 2-methyl-6-tert-butyl-p-hydroquinone with one mole of phosphorous trichloride at 100° C. over a 4 hour period. Another useful reaction product is obtained by reacting two moles of 2,6-dicyclohexyl-p-hydroquinone with one mole of phosphorous tribromide at 140° C. in an xylene solvent over an 8 hour period. The reaction product is recovered by merely washing the reaction mass with water and removing the solvent. Still another useful reaction product can be prepared by reacting 4 moles of 2,6-di(α-methylbenzyl)-p-hydroquinone with one mole of phosphorous trichloride in a pressure vessel employing a xylene solvent and a temperature of 200° C. for 30 minutes. As before, the product can be recovered by merely water washing the reaction mass and removing the excess solvent by distillation.

The compounds and reaction products of this invention are extremely useful as antioxidants in a wide variety of organic material normally susceptible to deterioration in the presence of oxygen. Thus, liquid hydrocarbon fuels such as gasoline, kerosene and fuel oil are found to possess increased storage stability when blended with a stabilizing quantity of an additive of this invention. Likewise, hydrocarbon fuels containing organometallic additives such as tetraethyllead, tetramethyllead, methyl cyclopentadienyl manganese tricarbonyl, cyclopentadienyl nickel nitrosyl, ferrocene and iron carbonyl have appreciably increased stability when treated with the additives of this invention. Furthermore, lubricating oils and functional fluids, both those derived from naturally occurring hydrocarbons and those synthetically prepared, have greatly enhanced stability by the practice of this invention. The additives of this invention are extremely useful in stabilizing antiknock fluids against oxidative degradation. For example, the stablizing additives of this invention find utility in stabilizing a tetraethyllead antknock fluid which contains ethylenedichloride and ethylenedibromide.

The additives of this invention are effective in stabilizaing rubber against degradation caused by oxygen or ozone. As used in the description and claims, the term "rubber" is employed in a generic sense to define a high molecular weight plastic material which possesses high extensibility under load coupled with the property of forcibly retracting to approximately its original size and shape after the load is removed. Some examples are acrylic rubber, butadiene-styrene rubber (SBR), chloroprene, chlorosulfonated polyethylene, fluorocarbon rubbers, isobutylene-isoprene (IIR), isoprene, butadiene, nitrile-butadiene rubber, polyisobutylene rubber, polysulfide rubbers, silicone rubbers, urethanes, India rubber, reclaimed rubber, balata rubber, gutta percha rubber, and the like. Both natural rubber and synthetic rubbers such as neoprene, SBR rubber, EPT rubber, GR-N rubber, chloroprene rubber, polyisoprene rubber, EPR rubber, and the like, are greatly stabilized through the practice of this invention.

The compounds of this invention are also useful in protecting petroleum wax against degradation. The additives also find use in the stabilization of fats and oils of animal and vegetable origin which tend to become rancid during long periods of storage because of oxidative deterioration. Typical representatives of these edible fats and oils are linseed oil, cod liver oil, castor oil, soy bean oil, rapeseed oil, coconut oil, olive oil, palm oil, corn oil, sesame oil, peanut oil, babassu oil, butter, lard, beef tallow, and the like.

The compounds of this invention are superior antioxidants for high molecular weight polyolefins such as polyethylene (both high pressure and so-called Ziegler type polyethylene) polybutene, polybutadiene (both cis and trans).

One of the features of the present stabilizers is that they do not cause discoloration when used in transparent, white, or light-colored organic materials such as white rubber or plastics such as polyethylene, polypropylene, and the like.

The amount of stabilizer used in the organic compositions of this invention is not critical as long as a stabilizing quantity is present, and can vary from as little as 0.001 weight percent to about 5 weight percent. Generally, excellent results are obtained when from 0.1 to about 3 weight percent of the stabilizer is included in the organic compositions.

The following examples serve to illustrate the use of the stabilizers of the present invention in stabilizing some representative organic materials normally subject to deterioration in the presence of oxygen or ozone.

EXAMPLE 5

A rubber stock is prepared containing the following components:

| Component: | Parts |
| --- | --- |
| Pale crepe rubber | 100 |
| Zinc oxide filler | 50 |
| Titanium dioxide | 25 |
| Stearic acid | 2 |
| Ultramarine blue | 0.12 |
| Sulfur | 3.00 |
| Mercaptobenzothiazole | 1.00 |

To the above base formula is added one part by weight of bis(3,5-di-tert-butyl-4-hydroxyphenyl)hydrogen phosphonate and, following this, individual samples are cured for 20, 30, 45 and 60 minutes, respectively, at 274° C. After cure, all of these samples remain white in color and possess excellent tensile strength. Furthermore, they are resistant to degradation caused by oxygen or ozone on aging.

EXAMPLE 6

A synthetic rubber master batch comprising 100 parts of GR-S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is prepared. To this is added 1.5 parts of bis(3,5-(α-methylbenzyl)-4-hydroxyphenyl)hydrogen phosphonate. This composition is then cured for 60 minutes employing 45 p.s.i.g. of steam pressure. The resulting synthetic rubber possesses resistance to oxygen and ozone induced degradation.

EXAMPLE 7

A butadiene acrylonitrile copolymer is prepared from 68 percent 1,3-butadiene and 32 percent acrylonitrile. Two percent, based on the weight of the copolymer of bis(3,5-diisopropyl - 4 - hydroxyphenyl)hydrogen phosphonate is added as an aqueous emulsion to the latex obtained from emulsion copolymerization of the butadiene and acrylonitrile monomers. The latex is coagulated with aluminum sulfate and the coagulum, after washing, is dried for 20 hours at 70° C. The synthetic copolymer so obtained is resistant to oxidative degradation.

EXAMPLE 8

Three percent of bis(3,5-di-tert-octyl-4-hydroxyphenyl)hydrogen phosphonate as an emulsion in sodium oleate is added to a rubber-like copolymer of 1,3-butadiene and styrene containing 25 percent styrene. The resulting synthetic elastomer possesses enhanced stability.

EXAMPLE 9

To a master batch of GR-N synthetic rubber containing 100 parts of GR-N rubber, 5 parts of zinc stearate, 50 parts of carbon black, 5 parts of road tar, 2 parts of sulfur and 2 parts of mercaptobenzothiazole is added 5 percent, based on weight, of bis(3,5-di-sec-butyl-4-hydroxyphenyl)hydrogen phosphonate. After curing, a synthetic rubber is obtained of improved oxidative stability.

EXAMPLE 10

To a master batch of polyethylene having an average molecular weight of 1,000,000, a tensile strength of 6,700 p.s.i., a Shore D hardness of 74 and a softening temperature under low load of 150° C., is added 5 percent of bis(3,5-di-tert-butyl-4-hydroxyphenyl)hydrogen phosphonate. The resulting polyethylene possesses stability against oxidative degradation and shows no tendency to yellow after extensive aging.

EXAMPLE 11

A linear polyethylene having a high degree of crystallinity (93 percent), and less than one branched chain per 100 carbon atoms, a density of about 0.96 gram per ml. and which has about 1.5 double bonds per 100 carbon atoms, is mixed with 0.005 weight percent of bis(3,5-dicyclohexyl-4-hydroxyphenyl)hydrogen phosphonate. The resulting polyethylene is found to possess stability against oxidative degradation.

EXAMPLE 12

To 100 parts of an ethylenepropylene terpolymer is added 3 parts of bis(3-tert-amyl-5-tert-octyl-4-hydroxyphenyl)hydrogen phosphonate, resulting in an ethylenepropylene terpolymer of enhanced stability.

EXAMPLE 13

To 100 parts of an ethylenepropylene rubber is added 2 parts of bis(3-tert-nonyl-5-sec-octyl-4-hydroxyphenyl) hydrogen phosphonate, resulting in an EPR rubber stock of improved stability.

EXAMPLE 14

After the polymerization of polypropylene in a hexane solvent employing a Ziegler catalyst, the catalyst is neutralized with water and bis(3,5-di-tert-butyl-4-hydroxyphenyl)hydrogen phosphonate is added to the mixture in quantities such that, after evaporation of the solvent, a Ziegler polypropylene is obtained containing 2 percent of bis(3,5-di-tert-butyl-4-hydroxyphenyl)hydrogen phosphonate. This polypropylene is found to possess excellent stability against degradation caused by oxygen or ozone. Furthermore, this polypropylene is found to resist degradation at elevated temperatures, even in the presence of oxygen. During this high temperature aging the Ziegler polypropylene shows no tendency to discolor.

EXAMPLE 15

To 1,000 parts of a crystalline polypropylene prepared using a Ziegler type catalyst is added 1 weight percent of the reaction product mixture of Example 4. The resulting mixture is melted and stirred, resulting in a molten polypropylene composition possessing excellent resistance to thermal degradation.

EXAMPLE 16

To 1,000 parts of poly-cis-butadiene disolved in benzene is added 0.15 weight percent of the reaction product resulting from the reaction of 3 moles of 2-methyl-6-($\alpha$-methylbenzyl)-p-hydroquinone with one mole of phosphorous tribromide at a temperature of 150° C. in a xylene solvent for one hour. The reaction product is added as a 30 percent solution in the xylene reaction solvent after merely washing the reaction mixture with water to remove acidic materials. The resultant poly-cis-butadiene solution is transferred slowly into boiling water which causes the water, benzene and the xylene to co-distill, leaving a stabilized poly-cis-butadiene.

EXAMPLE 17

To 1,000 parts of a crystalline polypropylene made using a Ziegler catalyst is added 1 weight percent of bis(3,5-ditert-butyl-4-hydroxyphenyl)hydrogen phosphonate. The mixture is melted and immediately stirred, giving a highly stable polypropylene.

EXAMPLE 18

To 1,000 parts of solvent-refined mid-continent neutral lubricating oil containing 0.05 percent zinc-dilaurylthiophosphate, 4 percent of a poly-laurylmethacrylate VI Improver and 0.05 percent of an overbased calcium sulfonate is added 0.05 percent of bis(3,5-dicyclohexyl-4-hydroxyphenyl)hydrogen phosphonate. The resulting oil is resistant to thermal and oxidant deterioration.

EXAMPLE 19

To 1,000 parts of an acrylonitrile-styrene-butadiene resin (ABS resin) is added 10 parts of carbon black and 5 parts of bis(3,5-di-tert-butyl-4-hydroxyphenyl)hydrogen phosphonate. The mixture is blended in a Banbury mixer, resulting in a highly stable ABS resin.

EXAMPLE 20

To 1,000 parts of a gasoline containing 26.6 percent aromatics, 20.8 percent olefins, 52.6 percent saturates and having an API gravity of 62.1 is added 10 parts of bis(3-tert-butyl-5-cyclohexyl-4-hydroxyphenyl)hydrogen phosphonate. The resulting gasoline is stable.

EXAMPLE 21

To 10,000 parts of gasoline containing 8.6 percent aromatics, 7.9 percent olefins, 83.5 percent saturates and having an API gravity of 68.5 is added 200 parts of the reaction product of Example 4. The resulting gasoline is stable against oxidative degradation.

EXAMPLE 22

To 10,000 parts of a gasoline containing 20.0 percent aromatics, 41.2 percent olefins, 38.8 percent saturates and containing additionally 1.5 grams of manganese per gallon as methyl cyclopentadienyl manganese tricarbonyl is added 300 parts of bis-(3-phenyl-5-tert-butyl-4-hydroxyphenyl) hydrogen phosphonate. The resulting gasoline containing a manganese antiknock was resistant to oxidative degradation.

EXAMPLE 23

To 10,000 parts of a gasoline containing 20.5 percent aromatics, 32.9 percent olefins and 46.6 percent saturates and containing 2.39 grams per gallon of tetraethyllead and one theory of chlorine as ethylenedichloride and 0.5 theory of bromine as ethylenedibromide is added 500 parts of bis(3,5-di-tert-butyl-4-hydroxyphenyl)hydrogen phosphonate. The resulting gasoline containing a lead antiknock and halogen scavenger is resistant to oxidative degradation. Not only this, but it is also found when used to give prolonged spark plug life due to the presence of the phosphorus-containing antioxidant.

EXAMPLE 24

To 10,000 parts of gasoline containing 38.1 percent aromatics, 7.3 percent olefins and 54.6 percent saturates and which contains 3.17 grams per gallon of lead as tetramethyllead, one theory of chlorine as ethylenedichloride, 0.5 theory of bromine as ethylenedibromide and 0.2 theory of phosphorus as tris($\beta$-chloroisopropyl)thionophosphate is added 50 parts of bis[3-tert-butyl-5-($\alpha,\alpha$-dimethylbenzyl) - 4 - hydroxyphenyl]hydrogen phosphonate. The resulting gasoline is resistant to degradation and also gives prolonged spark plug life on use.

EXAMPLE 25

An antiknock fluid composition is prepared by mixing together 61.5 parts of tetraethyllead, 17.9 parts of ethylenedibromide, 18.8 parts of ethylenedichloride and 1.3 parts of bis(3,5-di-tert-butyl-4-hydroxyphenyl)hydrogen phosphonate, resulting in a stable antiknock fluid composition.

EXAMPLE 26

To 1,000 parts of a commercial diesel fuel having a cetane number of 42 is added 5 parts of amyl nitrate and 4 parts of bis[3-n-propyl-5-(α-methylbenzyl)-4-hydroxyphenyl]hydrogen phosphonate, resulting in a diesel fuel of high resistance to oxidative deterioration which does not form gum or sludge on storage.

EXAMPLE 27

To 1,000 parts of a solvent-refined neutral oil (95 viscosity index and 200 SUS at 100° F.) containing 6 percent of a commercial methacrylate type VI Improver is added 5 percent of bis[3,5-di-(α-methylbenzyl)-4-hydroxyphenyl]hydrogen phosphonate, resulting in a stable lubricating oil.

EXAMPLE 28

To a solvent-refined crankcase lubricating oil having a viscosity index of 95 and a SAE viscosity of 10 is added 0.1 percent of bis(3,5-di-tert-dodecyl-4-hydroxyphenyl) hydrogen phosphonate. The resulting oil was stable against oxidative degradation.

EXAMPLE 29

To 100,000 parts of a petroleum hydrocarbon oil having a gravity of 30.3° API at 60° F., viscosity of 178.8 SUS at 100° F., a viscosity index of 154.2, and containing 1,000 parts of the reaction product of an alkenyl succinic anhydride where the alkenyl group has a molecular weight of 2,000, with a polyethylene amine, is added 200 parts of bis(3 - tert-amyl-5-tert-octadecyl-4-hydroxyphenyl)hydrogen phosphonate. The resulting lubricating oil possesses excellent dispersancy and is resistant to oxidative degradation.

EXAMPLE 30

To 100,000 parts of a commercially available pentaerythritol ester having a viscosity at 100° F. of 22.4 centistokes and known under the trade name of "Hercoflex 600" is added 400 parts of bis(3,5-dicyclohexyl-4-hydroxyphenyl)hydrogen phosphonate. The resulting synthetic lubricating oil possesses improved resistance against oxidative deterioration.

EXAMPLE 31

To 100,000 parts of dioctyl sebacate having a viscosity at 210° F. of 36.7 SUS, a viscosity index of 159, and a molecular weight of 427 is added 250 parts of bis(3-phenyl - 5-tert-butyl-4-hydroxyphenyl)hydrogen phosphonate, resulting in a synthetic diester lubricating oil having improved resistance to oxidative degradation.

EXAMPLE 32

To 1,000 parts of a commercial coconut oil is added 5 parts of bis[3-tert-butyl-5-(α-methylbenzyl)-4-hydroxyphenyl]hydrogen phosphonate, resulting in a vegetable oil with good aging characteristics.

EXAMPLE 33

To 100,000 parts of lard is added 100 parts of bis(3-tert - butyl-5-cyclohexyl-4-hydroxyphenyl)hydrogen phosphonate, resulting in a lard having resistance to rancidity.

The stabilizing additives of this invention are eminently useful as stabilizers in polyolefins such as polyethylene, polypropylene, and the like. In this use they function as antioxidants, antiozonants and also as thermal stabilizers. They are extremely long lasting and highly resistant to the formation of color.

In order to demonstrate their vastly superior stabilization effect tests were conducted using a commercial polypropylene. These tests are known as "Oven Aging Tests" and are recognized in the plastic industry as an accurate guide to oxidative stability. In these tests small specimens of polypropylene are prepared containing the test stabilizer. These test specimens are placed in an air circulating oven maintained at 150° C. Five replicates are made of each polypropylene-stabilizer composition and the test criteria is the time in hours until three of the five replicates show signs of deterioration. Deterioration is evidenced by cracking, discoloration or any visual appearance of change in the specimen.

Test specimens are prepared by mixing the test stabilizers with polypropylene powder for 3 minutes in a Waring Blendor. The mixture is then molded into a 6" x 6" sheet with a thickness of either 0.025" or 0.0625". This is accomplished in a molding press at 400° F. under 5,000 p.s.i. pressure. Each sheet is then cut into ½" x 1" test specimens in order to obtain the five replicate samples. These samples are then subjected to the Oven Aging Tests.

In order to compare the stabilizing additives of this invention tests were carried out employing several commercially accepted stabilizers along with the preferred stabilizer of the present invention. The results obtained are shown in the following table.

| Additive | Conc., wt. (percent) | Sample thickness, mil | Hours to failure |
|---|---|---|---|
| None | | 25 | 2.5 |
| 2,6-di-tert-butyl-4-methylphenol | 0.3 | 25 | 16 |
| 2,2'-methylenebis (4-methyl-6-tert-butylphenol) | 0.3 | 25 | 112 |
| 4,4'-thiobis(2-tert-butyl-5-methylphenol) | 0.3 | 25 | 96 |
| Tris(3,5-di-tert-butyl-4-hydroxphenyl) phosphite | 0.3 | 25 | 1,176 |
| Reaction product of Example 4 | 0.3 | 25 | 1,336 |
| Tris(3,5-di-tert-butyl-4-hydroxyphenyl) phosphite | 0.3 | 62 | >1,800 |

As the above table shows, the additive of the present invention increased the oven life of the polypropylene almost 700 times that obtained without any additive, and from 11 to 14 times as much as the life obtained with two commercially accepted antioxidants. Furthermore, the reaction product of Example 4 is even more effective on a weight basis than its principal component.

Further tests were conducted demonstrating the effectiveness of the antioxidants in lubricating oil. One of these tests was the Polyveriform Test. In this test, 100 ml. samples were prepared from a mid-continent solvent-refined neutral lubricating oil containing 0.1 weight percent ferric oxide in the form of ferric hexoate and 0.05 weight percent lead bromide. One sample was subjected to the test unstabilized and the other was stabilized with 1 percent of tris(3,5 - di-tert-butyl-4-hydroxyphenyl)phosphite. The test was run at two temperatures. In one, the samples were heated to 300° F. and in the other test they were heated to 325° F. In both tests, air was bubbled through the samples at a rate of 48 liters per hour. After 20 hours the test was discontinued and the acid number and viscosity increase of the oil samples determined. An increase in acid number or viscosity indicates oxidative or thermal deterioration.

| Additive | Acid No. increase at— | | Percent viscosity increase at— | |
|---|---|---|---|---|
| | 300° F. | 325° F. | 300° F. | 325° F. |
| None | 8.8 | 10.0 | 196 | 385 |
| Tris(3,5-di-tert-butyl-4-hydroxyphenyl)phosphite | 0.0 | 0.0 | 10 | 12 |

The above results show the stabilizers to be extremely effective. The stabilized oil showed no increase in acid number and only a fraction of the increase in viscosity shown by the unstabilized sample.

Another test conducted is the Panel Coker Test. In this test an oil sample is prepared containing one percent of the antioxidant test compound. The oil employed is a mid-continent solvent-refined neutral lubricating oil. The oil sample is placed in a sump located beneath an aluminum plate within the test apparatus. The aluminum plate is heated at 625° F. The test is conducted by spraying the test oil against the heated plate for a 5-second interval and then allowing 55 seconds for the oil to drain back into the oil sump. This one-minute cycle is continuously repeated over a 10-hour period, at which time the test is discontinued. The plate is allowed to cool and then rinsed with hexanes. The weight of the deposits formed on the plate is determined. Effective stabilizers function to reduce the amount of deposit formed in this test. The following table gives the amount of deposit formed when the test was carried out on an unstabilized oil compared to the amount formed with the same oil containing a stabilizer within the present invention.

Additive: Deposit weight (mg.)
None _____ 302
Tris(3,5-di-tert-butyl - 4 - hydroxyphenyl) phosphite _____ [1] 144; 139

[1] Replicates.

As this test shows, the additive effectively stabilizes the oil even at the extreme temperature of 625° F. Thus, it can be seen that both the compounds and the reaction products of the present invention are vastly superior to stabilizers available in the prior art.

The effectiveness of the present stabilizers can be enhanced still further by employing synergistic mixtures of the stabilizers of this invention. The preferred synergists are those having the formula:

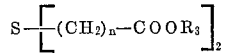

wherein $n$ is an integer from 1 to 5, and $R_3$ is selected from the group consisting of alkyl radicals containing from 1–20 carbon atoms, aryl radicals containing from 6–20 carbon atoms, aralkyl radicals containing from 7–20 carbon atoms, and cycloalkyl radicals containing from 6–20 carbon atoms. In the preferred synergist $n$ is an integer from 1 to 3 and $R_3$ is selected from the group consisting of alkyl radicals containing from 10–18 carbon atoms. The most preferred synergists are dilaurylthiodipropionate and distearylthiodipropionate.

The ratio of synergist to stabilizing compound should be adjusted to give the desired protection at the least cost. In essence, the ratio should be such that a synergistic amount of the synergist is present along with a stabilizing amount of the antioxidant compound. A synergistic amount can vary from as little as 0.001 weight percent up to about 5 weight percent, depending upon the substrate and the particular antioxidant. Generally, good results are obtained when from 0.1 to about 3 weight percent of the synergist is included in the organic composition. This can be accomplished by adding mixtures of the antioxidant compound and the synergist containing from about 1 to 99 percent synergist to about 99 to 1 percent stabilizer. Best results are usually obtained by adding mixtures containing from about 50 to 66 percent synergist and from about 34 to 50 percent stabilizer.

The synergists can be employed to obtain increased stability using the same concentration of stabilizer or they can be employed to obtain the same stability with less of the stabilizer. Synergists are especially useful in this latter application. Thus, although dilaurylthiodipropionate (DLTDP) is only moderately effective by itself in stabilizing polypropylene, when used with a compound of the present invention a synergistic interaction occurs, resulting in a degree of stability totally unexpected from the amount of stabilizers employed. This effect is shown in the following data obtained using the previously-described Oven Aging Test.

| Sample No. | | Conc., weight percent | Sample thickness, mil | Hours to failure |
|---|---|---|---|---|
| 1 | None | | 25 | 2.5 |
| 2 | DLTDP | 0.3 | 25 | 288 |
| 3 | Tris (3,5-di-tert-butyl-4-hydroxyphenyl) phosphite | 0.3 | 25 | 1,176 |
| 4 | Tris (3,5-di-tert-butyl-4-hydroxyphenyl) phosphite plus DLTDP | { 0.1 / 0.2 } | 25 | 1,024 |
| 5 | Reaction product of Example 4 | 0.3 | 25 | 1,336 |
| 6 | Reaction product of Example 4 plus DLTDP | { 0.1 / 0.2 } | 25 | 1,264 |

Despite the fact that Sample 4, containing the synergistic mixture, contained only one-third as much tris(3,5-di-tert-butyl-4-hydroxyphenyl)phosphite as did Sample 3, it can be seen that it exhibited almost the same oven life. Likewise, Sample 6 containing only one-third as much of the reaction product of Example 4 as in Sample 5 gives almost the same oven life. This can only be attributed to a synergistic interaction between DLTDP and the stabilizer, because DLTDP alone, even at 0.3 weight percent (Sample 2), gave an oven life of only 288 hours.

Following are some examples of the synergistic stabilizing compositions of the present invention.

Percent
Bis(3,5-di-tert-butyl-4-hydroxyphenyl)hydrogen phosphonate _____ 33
Dilaurylthiodipropionate _____ 67
Bis(3-methyl-5-tert - butyl-4-hydroxyphenyl)hydrogen phosphonate _____ 50
Dihexylthiodiacetate _____ 50
Bis(3-ethyl-5-isopropyl - 4 - hydroxyphenyl)hydrogen phosphonate _____ 1
Diheptylthiodivalerate _____ 99
Bis(3-methyl-5-cyclohexyl-4-hydroxyphenyl)hydrogen phosphonate _____ 99
Di-n-octyl-thiodipropionate _____ 1
Bis(3 - methyl-5-(α - methylbenzyl)-4-hydroxyphenyl) hydrogen phosphonate _____ 75
Didecylthiodiacetate _____ 25
Bis(3 - methyl-5-(α,α - dimethylbenzyl) - 4 - hydroxyphenyl)hydrogen phosphonate _____ 25
Diundecylthiodibutyrate _____ 75
Bis(3,5-dicyclohexyl-4-hydroxyphenyl)hydrogen phosphonate _____ 25
Dioctadecylthiodipropionate _____ 75
Bis(3-tert-butyl-5-(α-methylbenzyl)-4-hydroxyphenyl) hydrogen phosphonate _____ 80
Dinonadecylthiodibutyrate _____ 20
Bis(3 - tert-dodecyl-5-sec-octadecyl-4-hydroxyphenyl) hydrogen phosphonate _____ 60
Dieicosylthiodipropionate _____ 40
Bis(3,5-di-tert-butyl-4-hydroxyphenyl)hydrogen phosphonate _____ 10
Dilaurylthiodipropionate _____ 90
Bis(3,5-di-tert-butyl-4-hydroxyphenyl)hydrogen phosphonate _____ 90
Dilaurylthiodipropionate _____ 10
Bis(3,5-di-tert-butyl-4-hydroxyphenyl)hydrogen phosphonate _____ 30
Distearylthiodipropionate _____ 70
Reaction product of 3 moles of 2,6-diisopropyl-p-hydroquinone with one mole of phosphorous trichloride at 100° C. _____ 10
Dilaurylthiodipropionate _____ 90
Reaction product of 2 moles of 2,6-di-sec-butyl-p-hydroquinone and one mole of phosphorous tribromide at 125° C. _____ 90
Distearylthiodipropionate _____ 10
Reaction product of 4 moles of 2,6-di (α-methylbenzyl)-p-hydroquinone with one mole of phosphorous trichloride at 175° C. _____ 30
Dieicosylthiodibutyrate _____ 70

|   | Percent |
|---|---|
| Reaction product of 3 moles of 2-methyl-6-tert-amyl-p-hydroquinone with one mole of phosphorous tribromide at 75° C. | 70 |
| Dioctadecylthiodiacetate | 30 |
| Reaction product of 3.5 moles of 2,6-dicyclohexyl-p-hydroquinone with one mole of phosphorous trichloride at 125° C. | 50 |
| Dicetylthiodiacetate | 50 |

The above synergistic stabilizer compositions are beneficially employed in any of the previously-described organic materials normally susceptible to deterioration due to the effect of oxygen. In Examples 5 through 33, each of the above synergistic compositions can be substituted for the stabilizing additive of the present invention now shown, resulting in an organic composition of increased resistance to degradation from the effects of oxygen.

Having fully described new compounds and reaction products eminently useful in stabilizing organic materials and having further described synergistic combinations of these stabilizers with sulfur compounds and further shown use of these combinations in stabilizing organic material, it is intended that this invention should be limited only within the spirit and scope of the following claims.

I claim:

1. Synthetic organic polymers normally susceptible to deterioration due to the effects of oxygen containing a stabilizing amount of a compound having the formula:

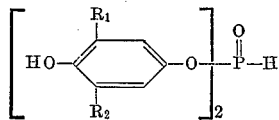

wherein $R_1$ is selected from the group consisting of alpha-branched alkyl radicals containing from 3–18 carbon atoms, alpha-branched aralkyl radicals containing from 8–18 carbon atoms and cycloalkyl radicals containing from 6–18 carbon atoms; and $R_2$ is selected from the group consisting of alkyl radicals containing from 1–18 carbon atoms, aralkyl radicals containing from 7–18 carbon atoms, aryl radicals containing from 6–18 carbon atoms and cycloalkyl radicals containing from 6–18 carbon atoms.

2. The composition of claim 1 wherein said organic polymers is an acrylonitrile-butadiene-styrene resin.

3. The composition of claim 1 wherein said organic polymers is a polyolefin.

4. The composition of claim 3 wherein said polyolefin is polypropylene.

5. A composition of claim 1 containing a synergistic amount of a synergist having the formula:

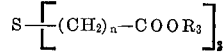

wherein $n$ is an integer from 1 to 5, and $R_3$ is selected from the group consisting of alkyl radicals containing from 1 to 20 carbon atoms, aryl radicals containing from 6–20 carbon atoms, aralkyl radicals containing from 7–20 carbon atoms and cycloalkyl radicals containing from 6–20 carbon atoms.

6. The composition of claim 5 wherein said compound is bis-(3,5-di-tert-butyl-4-hydroxyphenyl) hydrogen phosphonate and said synergist is dilaurylthiodipropionate.

7. The composition of claim 6 wherein said organic polymers is a polyolefin.

8. The composition of claim 7 wherein said polyolefin is polypropylene.

References Cited
UNITED STATES PATENTS

| 3,061,583 | 10/1962 | Huhn et al. | 260—45.7 |
| 3,245,949 | 4/1966 | Murdock | 260—45.95 |
| 3,361,846 | 1/1968 | Gleim | 260—45.95 |
| 3,386,952 | 6/1968 | Gleim | 260—45.95 |
| 3,406,186 | 10/1968 | Ley et al. | 260—45.95 |
| 3,493,638 | 2/1970 | Meltsner | 260—45.95 |
| 3,532,669 | 10/1970 | Hunter | 260—45.95 |

DONALD E. CZAJA, Primary Examiner

V. P. HOKE, Assistant Examiner

U.S. Cl. X.R.

99—163; 252—46.6, 49.8; 260—45.7 P, 45.95, 398.5, 666.5, 810, 814

PO-1050
(5/69)

UNITED STATES PATENT OFFICE
CERTIFICATE OF CORRECTION

Patent No. 3,635,884      Dated January 18, 1972

Inventor(s) Bernard R. Meltsner

It is certified that error appears in the above-identified patent and that said Letters Patent are hereby corrected as shown below:

Column 4, in Formula (II), "s-x" should read -- 3-x --.

Signed and sealed this 30th day of May 1972.

(SEAL)
Attest:

EDWARD M.FLETCHER,JR.       ROBERT GOTTSCHALK
Attesting Officer      Commissioner of Patents